United States Patent Office 3,412,080
Patented Nov. 19, 1968

3,412,080
THERMAL TREATMENT OF HIGH-DENSITY POLYOLEFINS
Joseph J. Smith, Upper Montclair, and Walter A. Miller, North Caldwell, N.J., and Frederick P. Reding, Charleston, W. Va., assignors to Union Carbide Corporation, a corporation of New York
No Drawing. Continuation of application Ser. No. 650,100, Apr. 2, 1957. This application July 5, 1966, Ser. No. 562,923
17 Claims. (Cl. 260—94.9)

This application is a continuation of the application of J. J. Smith, W. A. Miller and F. P. Reding, Ser. No. 650,100 filed Apr. 2, 1957.

The present invention relates to the thermal treatment of polyethylene. More particularly, it relates to a process for treating high molecular weight, high density, polyethylenes at elevated temperatures for an abbreviated period of time to cause the formation of high molecular weight, high density, polyethylenes with certain unique and improved characteristics for plastic applications.

The polyethylenes which can be improved by the practice of this invention include those high-density polyethylenes prepared by low pressure processes. For the purpose of better definition, this invention is concerned with the controlled modification of those high polymers of ethylene which have densities at 25° C. from 0.93 to 0.98 and melt indices of 0 to 10.

Those familiar with the fabrication and performance of polyethylene plastics will reocgnize that only those polyethylenes having melt indices of preferably no higher than about 50 (i.e. molecular weights greater than 14,500), are directly useful in plastic applications. For example, extrusion applied coatings on wire and cable give satisfactory performance only when the melt index of the polyethylene is less than about 10. The extrusion of strong polyethlene film, coatings, pipe or rods, can not be satisfactorily effected at melt indices higher than about 20. Similarly, for high speed injection molding, melt indices higher than about 50 are avoided since at these higher melt indices the resulting molded article is generally severely lacking in such properties as low temperature flexibility and resistance to environmental stress cracking.

The molecular weights referred to above are determined by measuring the viscosity of a solution of the polyethylene sample in tetralin (tetrahydronaphthalene) at 130° C. and applying the following equation:

Molecular weight$=(K \log n)/C$ where $n$=relative viscosity, $C$=0.40 gram of sample per 100 ml. and $K=5.64 \times 10^4$. Molecular weights determined in this manner are in good agreement (1) with those determined ebulliometrically in benzene for samples which have molecular weights between 500 and 2,000 and (2) with those determined by osmotic pressure techniques for samples having molecular weights higher than about 15,000.

The term "melt index" as employed throughout this specification refers to ASTM D1238–52T. For polyethylenes having melt indices between 10 and 89, the standard procedure is modified so that the total piston weight is 325 grams instead of 2160 grams. For measuring melt indices greater than 90, the total piston weight is also 325 grams and the temperature is reduced from the standard of 190° C. to 125° C. All final values are corrected to give gms./10 min. at 190° C. and 2160 grams load.

In addition to the polyethylenes of specific molecular weights and melt indices which can be produced by standard high pressure polymerization techniques, low molecular weight polyethylenes, useful as greases and waxes, can be produced by the pyrolytic degradation of the high molecular weight, high pressure, polyethylenes. Such pyrolyses can be effected usually by heating the polyethlene for one hour or more at elevated temperatures, or for shorter periods where suitable temperatures, i.e. 500° C. to 700° C. are employed. These degraded polyethylenes, having the properties of greases and waxes, can be obtained at somewhat lower temperatures but the heating must then be continued for more than two hours.

The degraded polyethylenes produced by these pyrolytic processes usually contain more than 5 percent by weight of unsaturated hydrocarbon oils which can be distilled from the product at 200° C. and 10 mm. When residues remain after such distillations, these are unsaturated greases or waxes which are too fluid at 125° C. to 190° C. to be measured by the melt index test. Modified test procedures indicate that these products would have melt indices greater than 5,000 and usually greater than 10,000. Depending on the specific application for the product, the polyethylene greases and waxes produced by pyrolyses vary in molecular weight from about 200 to about 5,000. The greases are soft, unctuous, semi-solids which are attacked by such solvents as benzene, heptane, and chlorinated hydrocarbons at room temperatures and which have essentially no tensile or flexural strength. The waxes are brittle, inflexible, solids at room temperature which are partially soluble in such solvents as benzene, toluene, and carbon tetrachloride at 25° C. and which are readily soluble in these solvents at 70° C.

Polyethylene greases and waxes are not employed as polyethylene plastics since they can not be fabricated into impact resistant molded articles; thin, flexible, film; or strong and tough rods, and although they may be useful lubricants for certain fabrication processes of polyethylene, the concentrations of such low molecular weight products must be kept at a minimum in order to avoid decreasing the impact strength, crack resistance, solvent resistance and other desirable properties of the polyethylene plastics.

Recent discoveries have shown that polyethylenes can also be produced at, or near, atmospheric pressures and at temperatures lower than 150° C. This class of polyethylenes also have the impirical formula —(—$CH_2$—)—n, contain some $>C=C<$ groups, and can be prepared to give products varying in molecular weight.

Illustratively, a suitable low pressure procedure for preparing the type of polyethylenes, i.e. linear polyethylenes, treated in accordance with the practice of the present invention is described in United States Application Ser. No. 647,932, filed Mar. 25, 1957, now U.S. Patent 3,210,334.

By way of further illustration other suitable substantially linear polyethylenes which we use are prepared by forming a mixture of ethylene monomer and a catalyst composition composed of titanium trichloride or titanium tetrachloride and most desirably a trialkyl aluminum wherein each of said alkyl substituents contains preferably 1 to 12 carbon atoms such as, for example, triisobutyl aluminum, triisopropyl aluminum, trioctyl aluminum and tridodecyl aluminum together with optionally an oxygen containing derivative thereof, such as, for example, triisopropoxide aluminum and heating said mixture to a temperature preferably between 0° C. and 80° C. Inert hydrocarbon diluents such as, for example, benzene, toluene, xylene, methylcyclohexane, cyclohexane, hexane, heptane or highly purified kerosene, can optionally be employed, and the proportions thereof are not critical. The molecular ratio of aluminum containing component to titanium when titanium trichloride is employed is usually in the range of about 1 to 10 moles and preferably 1 to 3 moles aluminum to 1 mole of titanium trichloride. Where titanium tetrachloride is used as cocatalyst the molecular ratio is usually in the range of 1 to 10 moles and preferably, 2 to 5 moles of aluminum containing component to 1 mole of titanium tetrachloride.

The catalyst system disclosed in the aforesaid United States application entitled, "Catalytic Polymerization of Ethylene," Ser. No. 647,932 of Wayne L. Carrick, filed Mar. 25, 1957, now U.S. Patent 3,210,334 as well as those catalysts systems described immediately hereinabove, wherein high ratios of alkyl aluminum to titanium chloride are had, yield high polymers of ethylene of particularly desirable qualities but of very high molecular weights such that the melt indices thereof are usually of about 0. Such polymers are characteristically incapable of being molded or extruded until treated in accordance with the process described herein.

However, the polymer molecules obtained by these low pressure processes have much less chain branching than is the case in typical high pressure polyethylenes. In fact, these low pressure polyethylenes are now referred to as "linear polyethylenes." The densities of these polyethylenes at 25° C. are generally higher than 0.93 and can be as high as 0.98. Density as expressed herein unless otherwise explicitly indicated is in terms of grams per cubic centimeter (g./cc.) at 25° C. As a result of this more linear molecular structure, the low pressure polyethylenes are much more crystalline and are, therefore, considerably harder, stronger and stiffer, higher melting, and more solvent resistant than the high pressure polyethylenes.

Even so, these extremely high molecular weight linear homopolymers of ethylene normally have the potential of higher density and greater crystallinity but are so high in molecular weight that it would take essentially an infinite annealing time to reach their ultimate degree of crystallinity. Mild and controlled thermal treatment as described herein, we have discovered, presents a means of unlocking this crystallization potential and simultaneously reducing the molecular weight to levels normally used for molding and extrusion purposes and the like.

The effects of the highly linear molecular structure on physical properties and performance are so pronounced that, for all practical purposes, the higher density polyethylenes are a new class of thermoplastic polymers. This is illustrated in the following comparison of properties for a typical high pressure polyethylene, a typical low pressure polyethylene, and a representative polystyrene.

TABLE I

| | Polyethylene | | Polystyrene |
| --- | --- | --- | --- |
| | High Pressure | Low Pressure | |
| Melt Index | 1.0 | 0.8 | |
| Density at 25° C | 0.92 | 0.96 | 1.05 |
| Stiffness, p.s.i | 25,000 | 150,000 | 500,000 |
| Tensile Strength, p.s.i | 2,000 | 4,000 | 7,000 |
| Elongation, percent | 500 | 50 | 2 |
| Izod Impact at 0° C | >5 | >5 | 0.4 |
| Brittle Temperature, °C | <−100 | <−100 | (1) |
| Melting Temperature, °C | 115 | 135 | |
| Resistance to Aromatic and Chlorinated Hydrocarbons | (2) | (3) | (4) |

1 Fails at 25° C. ca. 90.
2 Good at 25° C., poor at 75° C.
3 Excellent at 25° C., good at 75° C.
4 Poor at 25° C., and 75° C.

The overall properties of the high density polyethylenes indicate a wide potential in plastic applications. The higher stiffness, resulting from the higher crystallinity of these polyethylenes, is of particular value in the preparation of a new class of impact resistant molded articles. Similarly, film and coatings of these polyethylenes possess a superior resistance to moisture permeation and to oils or greases for food packaging use.

A high density polyethylene may have a somewhat different solution viscosity molecular weight, as defined earlier, than a lower density polyethylene of the same melt index. However, only the higher molecular weight polymers are useful for fabricating molded, drawn, and extruded plastic articles for both classes of polyethylenes. In order to form impact resistant, molded, articles; tough, extruded, film, coatings, pipe and rod the melt indices of these high density polyethylenes will have to be in the order of less than 100 and preferably in the melt index range of 0.1 to 50.

Although the high density polyethylenes have the numerous property advantages indicated, certain difficulties have been encountered in the production and fabrication of these polymers which have serious consequences in their use. For example, these polyethylenes are most economically produced at melt indices of less than about 1.0 due to the higher catalyst consumption and product contamination, by catalyst residues, involved in producing higher melt index products. Furthermore, certain properties, e.g. light stability, solvent resistance, low temperature flexibility of the polymers become relatively poorer as the melt index is increased above 1.0. These latter deficiencies become so pronounced at melt indices above about 10 that these products are essentially eliminated from many of the applications for which they would ordinarily be deemed most desirable. These failings of the relatively higher melt index polymers are due, at least in part, to the presence of significant concentrations of low molecular weight polyethylenes. These low molecular weight components have the properties of greases and waxes and are concurrently formed under the polymerization conditions employed to obtain the higher melt index polymers.

It is thus considered most desirable that the high density polyethylenes be produced to have melt indices of less than about 10 and preferably no higher than about 1.0. However, this would considerably restrict the scope of potential uses of these polymers since numerous fabricating problems are encountered in molding, and extruding operations with these polymers at melt indices of 1.0 or less.

Our invention therefore is based on the unexpected discovery that polyethylenes solid at 25° C. and characterized by having densities at 25° C. of 0.94 to 0.98 and melt indices between 0.1 and 100 and preferably no higher than 50 can be formed under controlled conditions which substantially avoid the concomitant formation of unsaturated hydrocarbon liquids, greases and waxes by heating high polymers of polyethylene having densities at 25° C. in the range of 0.93, and preferably from 0.94 to 0.98 and melt indices of 0.0 to 10 for a period of time, most preferably in a uniform manner, at a temperature sufficient to cause the thermal change thereof and in the range of 300° C., and most desirably from about 325° C. to 475° C. This uniform heating is so conducted that substantially all of the polyethylene receives substantially the same thermal treatment. Polyethylenes produced by the process of our invention have all the desirable characteristics of the lower melt index, high density, polyethylenes from which they were derived i.e. excellent solvent resistance, high impact strength, tensile strengths in excess of 2000 p.s.i., stiffness values higher than 60,000 pounds per square inch (p.s.i.) and flexibility at subzero temperatures i.e. brittle temperatures (ASTM D-746-557) lower than 0° C., and in addition, manifest an unexpected superiority to polyethylene plastics of comparable melt indices obtained by direct polymerization techniques in such respects as molding behavior and film extrusion as well as in the physical properties and performance of the fabricated articles. Indeed films produced from resins prepared in accordance with the practice of our invention have markedly greater film clarity as indicated by haze, gloss and see-through values.

Further, uniform films of polyethylene and particularly those having thicknesses of 1.5 mils or less can be prepared from the thermally treated polyethylene resin of this invention by standard procedure, such as a linear die or flat-film process. These films have haze percentages normally of 8 percent to 20 percent as determined by ASTM Procedure D–1003–52 using a Gardner-Haze Pivotal Sphere Unit; gloss values of at least 50 to 130, as determined by ASTM Procedure D–523–53T using a Gardner Unit, and see-through values of at least 20 feet (ft.) and usually from 40 feet to 70 feet.

The properties and behavior of the polyethylenes produced by the practice of this invention are not dependent on the presence of air, oxygen or any particular reactive chemical agents during the heating of the polyethylene. The polyethylene may be treated as it normally occurs, e.g. pellets, spheres, powder, or it may be heated under vacuum to remove any trapped air without departing from the major desirable effects obtained.

The effects produced are such that the higher the temperature employed the shorter will be the time that the polyethylene will have to be heated. For example, at a temperature of 425° C., the heating time will not generally exceed 60 seconds. On the other hand, at temperatures as low as 325° C., the heating may have to be extended to 600 seconds to attain the desired effects. At temperatures above 475° C. the heat treatment is extremely difficult to control and even with exposure periods as short as 5 seconds, the polyethylene may be pyrolytically degraded to produce some grease and wax. At temperatures lower than about 325° C., but within the conditions stated herein, the desired effects are produced only after long periods of heating, i.e. often greater than about 30 minutes or more. This extended time tends to militate against the continuous production features of this process which make it so attractive for economical, large scale, production of improved high density polyethylene plastics.

The temperature selected in any given case will depend primarily on the melt index of the starting polyethylene and the melt index of the desired product. The temperature selected will usually be higher as the melt index of the starting polyethylene is reduced. For example, temperatures in the range of 375° C. to 425° C. are normally used if the polyethylene to be modified has a melt index lower than 0.1 and the product desired is to have a melt index no higher than 10. If, on the other hand, the polyethylene to be modified has a melt index of about 5 and is to be treated to obtain a product which will have a melt index of about 10, the temperature used will usually be as low as 325° C. As normally practiced the temperatures to which the polyethylene is heated are in the range of approximately 325° C. to 450° C. and the time of heating varies from 10 to 600 seconds.

As a rule it is not desirable to effect too large an increase in melt index during this heat treatment, since this can adversely affect the properties and performance of the product. For example, if the original polyethylene has a melt index of 0.1 or less, the melt index of the product should not generally exceed 15. If the melt index of the original polyethylene is about 1.0 then the product melt index should usually be less than 30. When the preferable starting polyethylene has a melt index of about 10, the product should not have a melt index greater than 50.

In the temperature range of about 300° C. to 475° C. at which our thermal treatment occurs, these polyethylenes are readily oxidized. As little as 0.2 percent oxygen by weight introduced into the polyethylene by oxidation can have deleterious effects e.g. brittleness, poor color, poor electrical properties, on the product, and these effects must be avoided in the practice of this invention. The polyethylene must not, therefore, be exposed to air or oxygen during treatment at these elevated temperatures. It has been found, however, that the small amounts of air which may be normally trapped in the polyethylene particles to be heat treated, or air which is in the heat treating apparatus at the beginning of the heat treatment are not usually harmful.

A variety of methods can be used to thermally treat polyethylene in accordance with the practice of our invention.

Illustratively, in one preferred method the polyethylene is fed to a one and one-quarter inch Hartig extruder fitted with a single flight metering screw and having a barrel diameter of 1¼ inch (manufactured by the Hartig Engine and Machine Company, Inc., Hillside, N.J.). The barrel of this extruder is maintained at a temperature between 225° C. and 275° C. The head of the extruder is fitted with a heating chamber, referred to as the "heated tube." This latter comprises a straight 1 inch bore stainless steel, or Hastelloy tube which is 12 inches long and fitted with a torpedo consisting of a stainless steel or Hastelloy rod, running longitudinally in the tube. (Hastelloy C was employed in this apparatus and is described in Bulletin F3361H September 1, 1951, of the Haynes Stellite Co., division of Union Carbide and Carbon Corporation N.Y.C., N.Y.) The diameter of the torpedo has been varied from ¾ inch to 15/16 inch. In this manner annular channels of ⅛ inch to 1/32 inch in thickness have been used. As the polyethylene flows through this annulus, under pressure from the extruder, it is heated by use of electrical heaters banding the outside of the tube. The temperatures of the tube and the molten polyethylene being heat treated in the tube are measured by appropriately located thermocouples. Residence time for the polymer at the treating temperature have been varied preferably from 10 to about 600 seconds in this apparatus.

Best results are obtained at smaller annular thicknesses (1/16 inch to 1/32 inch) since in these cases the entire body of the polyethylene being treated can be rapidly heated to the desired temperature. In other words, the polyethylene can be heat treated more uniformly at smaller annular thicknesses. At annular thicknesses of ⅛ inch and greater, there is a tendency for that portion of the polyethylene in immediate contact with the outer (heated) tube wall to be treated at a higher temperature than the inner portion of the polyethylene. This can be partially remedied by employing a heated torpedo, in which case the annular space can be increased to 3/16 inch.

The modified polyethylene flowing from the "heated tube" is passed directly into a rotating disc viscosimeter operating at a predetermined temperature in the range of 200 and 250° C. This instrument continuously indicates the product melt viscosity, which, in turn, is used to control the temperature of the "heated tube." From here the product is extruded as a rod, passed through a quenching bath, and, then, to a dicer for pelletizing.

In a second method, the polyethylene is treated in a "heated mill" which continuously mills and heat treats the polymer. This apparatus is described in U.S. Patent 2,434,707 and it accomplishes the combined functions of heating, milling and conveying the polymer. The essential feature of this mill is the use of helically-threaded rolls which are rotated in opposite directions to draw the polyethylene into the bite provided by a radial clearance in excess of mechanical clearance in the zone of intermesh between these rolls. These rolls are housed in such manner that a heating jacket is provided and there is a chamber over at least part of the threaded portion of the roll whereby the material can be heat treated in the presence of an inert gas such as nitrogen or subjected to a vacuum during the thermal treatment. Under these operating conditions, the polyethylene is usually heated at atmospheric pressure or at reduced pressures as low as 5–10 mm., repeatedly worked as it passes through the bite, blended to assure temperature uniformly, and conveyed along the rolls to the discharge end by the helical threads.

This continuous mill may be fed by any convenient, continuous, arrangement. Generally, the polyethylene is preheated to about 200° C. before it enters the mill which is heated by passing hot liquids, or vapors, into the heating jacket. Heat transfer agents, such as "Dowtherm," a eutectic mixture of 73.5 percent diphenyl ether and 26.5 percent diphenyl are used in the heating jacket over the operative temperature ranges described herein (i.e. preferably in excess of 300° C. to 400° C.). Total residence time in the mill can be varied from 10 to 600 seconds. However, since the polyethylene enters the mill at about 200° C., it can be exposed to the heat treating temperature for as little as 5 seconds a the faster mill speeds.

In this "heated mill" process, the temperature at which the polyethylene is treated may be slightly higher than the temperature in the mill heating jacket. This results from the working of the plastic which occurs and may, in some cases, produce a treating temperature 20° C. higher than the mill jacket temperature. The temperature at which the polyethylene is being treated in any given case may be determined by inserting a thermocouple in the molten polyethylene at a point immediately before the discharge pipe of the mill. The polyethylene being discharged from the mill is passed through the discharge pipe, which reduces its temperature to less than 300° C. and preferably less than 275° C., extruded as a rod, passed through a water bath, and, then chopped to yield suitable pellets.

Many other methods of uniformly heating the polyethylene in the effective temperature range for short periods of time can be employed, including many commercially available extruders which can be successfully operated at these higher than normal operating temperatures. In some cases, the feeding and milling of the polyethylene, especially those with melt indices less than 0.1, may be facilitated by adding 5 to 90 percent by weight of such solvents as cyclohexane, heptane, and xplene. These can be removed from the product by vacuum milling during heat treatment.

Certain of the major improvements obtained by the practice of this invention are related to the improved melt viscosity characteristics of the product polyethylene compared (1) to the original high density polyethylene and (2) to standard low pressure process polyethylenes having melt indices equivalent to the products of this invention.

One area where decided and novel improvements are observed is the field of high speed injection molding, where product melt indices from 5 to 35 are commonly used. However, the high density polyethylenes which have the most desirable physical properties also have melt indices less than about 5. When these latter polyethylenes are molded at the low temperatures, pressures, and time cycles, preferred for high speed injection molding, the articles obtained have a tendency to delaminate or "skin" and display low gloss. Not only is the high density polyethylene considerably improved in these regards by our heat treatment process but the product is superior in "skinning resistance" and gloss to a standard low pressure process, polyethylene directly polymerized under conditions which give high density polyethylene of high melt index for high speed injection molding.

Another surprising advantage, pertinent for molding and other applications, is the increase in density obtained by our heat treatment process. After heat treatment, the polyethylene is usually from 0.002 to 0.027 and higher in density. As a result, the product is somewhat stiffer and harder than the polyethylene from which it was derived and, generally, much stiffer and harder than a standard, low pressure process, polyethylene having a comparable melt index. This increase in density is most pronounced with those high density polyethylenes having melt indices in the order of 0.01 or less. Some of the low pressure polyethylenes prepared to have such low melt indices have densities as low as 0.935. After the heat treatment these polyethylenes usually have densities of 0.945 or greater.

Among the unexpected improvements observed for the extrusion of polyethylene film is the superior clarity obtained for the heat treated high density polyethylenes. This is especially important for the low pressure polyethylenes where the cloudy, hazy, film obtained with conventional extrusion equipment has made these polyethylenes unlikely candidates for packaging applications. Heat treated, high density, polyethylene film can be now obtained, with conventional extrusion equipment, which has a clarity rivaling that of cellophane. Furthermore, the heat treated polyethylenes at melt indices of 1.0 to 8.0 give thin film (0.2 to 1.0 mil) of uniform thickness at fast flat-die and tubular extrusion rates, an essential feature not now found in low pressure polyethylenes over the melt index range of 0.3 to 8.0. Finally, the heat treated, low pressure, polyethylene films are superior in impact strength to films obtained from low pressure process polyethylenes of comparable melt indices.

Because of the insolubility of the products of this invention in solvents at temperatures below 100° C., spectrophotometric analyses on solid films have been employed to measure any structural or chemical changes produced. The infra-red absorption curves of these products and those of the corresponding polyethylenes from which these products were derived are identical in every major respect. In some cases, the product contains very small concentrations of OH (2.9 millimicrons) and $C=O$ (5.8 millimicrons) groups, i.e. less than 0.1 percent $>C=O$ by weight, not found in the polyethylene from which it was derived. As a rule, a small increase in methyl group (7.25 millimicrons) concentration is noted. Some small changes in the amount and configurational forms of the ethylenically unsaturated groups ($>C=C<$) are also noted in the 10–12 micron region. However, these measurements show that both the products and the parent polyethylenes contain less than 0.6 percent, and usually less than 0.3 percent $>C=C<$ groups on a weight basis.

As a rule, there is an increase in the crystalline content of the polyethylene as a result of this heat treatment. This increase is manifested as an increase in density and melting point. There is also some reduction in number average molecular weight as revealed by an increase in melt index. However, as pointed out above, it is preferable to keep this change in melt index within certain limits in order to avoid a loss in properties.

As indicated above, it has been recognized for some time that the density, or degree of branching, in a polyethylene plays a major role in determining the stiffness and other physical properties of the polyethylene plastic. The average molecular weight, or melt index, is also known to be a major factor both with regard to properties and fabricating behavior. This is illustrated by the fact that polyethylene plastics fabricated in a given manner generally fall within a narrow range of melt indices e.g. the extrusion of free, thin, film is usually carried out with polyethylenes having melt indices between 2 and 8. It is now also becoming clear that, for a given density and melt index range, molecular weight distribution is a very important factor. This appears to be especially important for the low pressure process polyethylenes.

As normally produced high density polyethylene plastics are mixtures of molecular chains which vary over a wide range in chain length or molecular weight. For example, a high density polyethylene having a melt index of about 2 and an average molecular weight in the region of 20,000 will contain a significant proportion by weight of molecules in the 2,000 to 10,000 molecular weight range and a significant proportion by weight of molecules having molecular weights of greater than 100,000.

There is evidence to indicate that high density polyethylenes which contain relatively high proportions of such lower molecular weight fractions behave poorly during film extrusion, i.e. tend to "neck in," give a laminar formation, i.e. "skinning," during injection molding. The plastic articles obtained from this class of polyethylenes are also relatively poorer in impact resistance, low temperature flexibility, environmental-stress cracking resistance, and solvent resistance.

On the other hand, those high density polyethylenes which contain a relatively high proportion of very high molecular weight molecules give molded articles of poorer gloss, and extruded films which are of inferior clarity and non-uniform thickness. Furthermore, these polyethylenes cannot be properly hot drawn for the formation of rods and filaments.

Ideally, therefore, a high density polyethylene to be used for a given application should have very low proportions of both the very low molecular weight molecules and the very high molecular weight molecules, i.e. possess a narrow molecular weight distribution.

We have observed that those polymerization conditions which give high density polyethylenes of lower melt index, e.g. less than 5, also yield relatively small amounts of low molecular weight molecules. These polyethylenes are superior in physical properties and performance for molded articles, but present fabricating difficulties for extrusion purposes due to the relatively large amount of very high molecular weight molecules present. When these lower melt index polyethylenes are heat treated under the essential conditions of our invention, there is a large and important reduction in the relative amount of very high molecular weight molecules but only a small and non-deleterious increase in the relative amount of low molecular weight molecules. In this manner, the desirable properties and performance of the original low melt index polyethylene are retained, or enhanced, while the product is made much easier to fabricate. In other words, by this process a high density polyethylene of any specific density and commercially practical melt index can be prepared which has a narrower molecular weight distribution than a high density polyethylene directly polymerized to give that density and melt index.

At the same time, low pressure polyethylenes having melt indices in the range of 0 to 5 when heat treated in accordance with the practice described herein, to slightly higher melt indices which are still less than 5, e.g. melt index of 0.01 also possess improved qualities despite only a slight increase in melt index. Thus, polyethylenes so treated evidence a marked increase in density, and are more desirable for use in molded articles due to greater crack-resistance and toughness.

Thermal treatment by our procedure, results in an increase in the melt index of the treated polyethylene of at least 0.01 and up to a melt index of 100, and preferably of at least 0.1 where the treated polyethylene had an original melt index of 0. It is noted that by the practice of this invention improvements may be obtained in polyethylenes prepared by a variety of processes provided these polyethylenes have densities at 25° C. higher than 0.930 and preferably above 0.94 and melt indices no higher than 10, and provided the resulting heat treated polyethylene has a density at 25° C. of at least 0.940 and a melt index preferably no higher than 50, and not less than 0.01.

Example 1

A low pressure process polyethylene having a melt index of 1.6, and a density of 0.951 was passed through a standard Hastelloy tube heated to 402° C. by electrical band heaters. This tube was twelve inches long with a bore of one inch. Throughout the center of this tube there was fitted a Hastelloy rod having a diameter of 15/16 of an inch. This produced a 1/32 inch thick annulus (annular mean diameter—31/32 inch) through which the molten polyethylene passed at the rate of 40 grams per minute.

The temperature of the polyethylene in the tube was found to be 368° C. and it was calculated that the residence time of the polyethylene in the heated tube was 28 seconds. The product was then passed through a disc mill (230° C.) from which a rod was extruded. This rod was cooled by passing it through a water bath, and it was, subsequently, cut into pellets. The product had a melt index of 18 and a density of 0.953. Properties on this heat treated polyethylene, the original polyethylene from which it was derived, and a low pressure polyethylene directly produced to have a melt index of 18 for high speed injection molding are compared as follows:

| | Original Polyethylene | Heat Treated Polyethylene | Standard Low Pressure Polyethylene |
|---|---|---|---|
| Melt Index | 1.6 | 18 | 18 |
| Density [1] | 0.951 | 0.953 | 0.950 |
| Tensile Strength, p.s.i. [1] | 3,400 | 3,100 | 2,800 |
| Percent Elongation [1] | 85 | 40 | 45 |
| Secant Modulus, p.s.i. [1] | 73,000 | 95,000 | 65,000 |
| Brittle Temperature °C. [1] | −75 | −60 | −45 |
| Minimum Gloss Temperature, I.R. [2] | 550 | 375 | 425 |
| Minimum Non-Skinning Temperature, °F. [2] | 525 | 350 | 400 |

[1] Properties determined from compression molded specimens.
[2] Properties determined from injection molded specimens.

The heat treated polyethylene can be injection molded (5,000 p.s.i.) to give glossy articles at a molding temperature much lower than that necessary to get glossy articles from either the original polyethylene or the low pressure process polyethylene prepared for injection molding use. Furthermore, the heat treated polyethylene was much stiffer (higher secant modulus) than the standard low pressure process polyethylene with the latter having only a slight advantage in percentage elongation.

Example 2

A low pressure polyethylene resin having a melt index of 0.02 and a density of 0.948 was heat treated by using the apparatus and procedure described in Example 1. However, in this case, the tube temperature was 435° C., the temperature of the polyethylene in the tube was 394° C., and the residence time of the polyethylene in the tube was 37 seconds. After this heat treatment, the product was put through a standard vacuum mill at 250° C. and 5–6 mm. in order to remove a slight odor. The loss in weight of the polyethylene due to this vacuum milling step was less than 0.2 percent by weight. The product had a melt index of 15 and a density of 0.958. There was no change in melt index or density produced by the vacuum milling step.

Although the original polyethylene, in this case, could not be satisfactorily injection molded, impact resistant injection molded pieces were satisfactorily obtained from the product after heat treatment. The product had a brittle temperature of −85° C., melted between 131° and 134° C., and was insoluble in benzene, carbon tetrachloride, or toluene at 75° C.

Example 3

A low pressure polyethylene resin having a melt index of 0.004 and a density of 0.953 was heat treated by use of the apparatus and procedure described in Example 1 except that a 3/4 inch Hastelloy rod was inserted throughout the tube. Therefore, the molten polyethylene passed through a 1/16 inch thick annulus in this case. The tube temperature was 420° C. and the temperature of the polyethylene was 385° C. in the tube. Residence time of the polyethylene in the heated tube was 35 seconds. The product had a melt index of 4.7 and a density of 0.960.

Of particular importance is the fact that the heat treated polyethylene was satisfactorily injection molded at temperatures and pressures suitable for commercial scale production. The original resin could only be injection molded under conditions which are inconsistent with present commercial practice. The following list compares the properties on compression molded specimens of the heat treated polyethylene resin, the original polyethylene and a comparable, high density, polyethylene prepared under low pressure polymerization conditions which gives a polymer of melt index 5.

|  | Original Polyethylene | Heat Treated Polyethylene | Standard Process Polyethylene |
| --- | --- | --- | --- |
| Melt Index [1] | 0.004 | 4.7 | 5.1 |
| Density [1] | 0.953 | 0.960 | 0.953 |
| Tensile Strength, p.s.i. [1] | 3,400 | 3,700 | 3,100 |
| Percent Elongation | 110 | 40 | 50 |
| Secant Modulus, p.s.i. | 130,000 | 160,000 | 110,000 |
| Brittle Temperature, °C | −105 | −95 | −100 |
| Minimum Non-Skinning Temp., °F. [1] | >600 | 500 | 600 |

[1] Injection molded specimens.

The original polyethylene of this example is produced more economically than is the polyethylene directly prepared to a melt index of 5. This is due to the necessity of using much more polymerization catalyst to obtain the higher melt index. For the slight additional expense of heat treating this low melt index resin, therefore, a generally superior, high density polyethylene is obtained for molding.

Example 4

A low pressure process polyethylene having a melt index of 0.5 and a density of 0.951 was heat treated by use of the apparatus and procedure described in Example 1. The tube temperature was 404° C., and the temperature of the polyethylene in the tube was 372° C. Residence time of the polyethylene in the heated tube was 18 seconds. The product had a melt index of 10 and a density of 0.953.

The following list compares the properties of this product and compression molded specimens obtained from it with similarly obtained properties of a standard, low pressure process, polyethylene prepared under polymerization conditions which directly give a polyethylene having a melt index of 10.

|  | Original Polyethylene | Heat Treated Polyethylene | Standard Process Polyethylene |
| --- | --- | --- | --- |
| Melt Index | 0.5 | 10 | 10 |
| Density | 0.951 | 0.953 | 0.952 |
| Secant Modulus, p.s.i. | 75,000 | 90,000 | 80,000 |
| Tensile Strength, p.s.i. | 3,200 | 3,600 | 3,300 |
| Elongation Percent | 90 | 50 | 60 |
| Brittle Temperature, °C | −105 | −80 | −60 |
| Minimum Skinning Temp., °F. [1] | 600 | 400 | 475 |

[1] Injection molded specimens.

Example 5

A low pressure process polyethylene having a melt index of 0.002 and a density of 0.953 was heat treated by use of the apparatus and procedure described in Example 1. The tube temperature was 405° C. and the temperature in the polyethylene in the tube was 371° C. Residence time of the polyethylene in the heated tube was 31 seconds. The product had a melt index of 13 and a density of 0.963.

The following list compares the properties of the compression molded specimens obtained from the heat treated polyethylene with those obtained on similarly prepared compression molded specimens from a standard, low pressure process, polyethylene prepared under polymerization conditions which give a polyethylene having a melt index of 13.

|  | Original Polyethylene | Heat Treated Polyethylene | Standard Process Polyethylene |
| --- | --- | --- | --- |
| Melt Index | 0.002 | 13 | 13 |
| Density [1] | 0.953 | 0.963 | 0.954 |
| Secant Modulus, p.s.i. [1] | 130,000 | 150,000 | 105,000 |
| Tensile Strength | 3,800 | 4,200 | 3,400 |
| Elongation, Percent | 60 | 35 | 50 |
| Brittle Temperature, °C | −105 | −100 | −60 |

[1] All properties obtained on compression molded specimens.

Example 6

A low pressure process polyethylene having a melt index of 0.003 and a density of 0.953 was heat treated by use of the apparatus and procedure described in Example 1. In this case, the tube temperature was 397° C., the polyethylene in the tube was at 364° C., and the residence time of the polyethylene in the tube was 28 seconds. The product had a melt index of 4.0 and a density of 0.961.

The original polyethylene in this case could not be extruded to give thin (0.1–1.5 mil) film by either the flat or tubular die processes. After heat treatment, however, the product was readily extruded by either process to give films of 0.1 to 2.0 mils in thickness which were very clear, tough, and strong. The product was also highly satisfactory for the extrusion coating of paper and metal foil. The following table compares the properties of a flat-die, extruded film from this heat treated polyethylene with the properties of film similarly obtained from a standard, low pressure process, polyethylene prepared under polymerization conditions which directly give a polyethylene of melt index 4.

|  | Original Polyethylene | Heat Treated Polyethylene | Standard Process Polyethylene |
| --- | --- | --- | --- |
| Melt Index | 0.003 | 4.0 | 4.0 |
| Density | 0.953 | 0.961 | 0.953 |
| Secant Modulus, p.s.i. | 130,000 | 160,000 | 100,000 |
| Compound Extrusion Temp., °C |  | 179 | 178 |
| Drawdown thickness, mils/FPM |  | 0.1/60 | 1.5/60 |
| Test Film Thickness, mils |  | 1.5 | 1.5 |
| Falling Ball Impact, inches |  | 17 | 6 |
| Tear Resistance, gms./mil: |  |  |  |
| Machine direction |  | 26 | 18 |
| Transverse direction |  | 62 | 800 |
| Tensile Strength, p.s.i.: |  |  |  |
| Machine direction |  | 3,560 | 3,390 |
| Transverse direction |  | 3,390 | 2,770 |
| Haze, Percent |  | 9 | 89 |
| Gloss×10⁻³ |  | 127 | 9 |
| See-through, feet |  | 48 | 0 |
| Specular Light Transmission, Percent |  | 63 | 0.4 |
| Brittle Temperature, °C.[1] | −105 | −105 | −90 |

[1] All properties obtained on compression molded specimens.

These results show that the heat treated polyethylene yields film which is generally superior in properties to the film obtained from the standard process resin. Of considerable commercial significance is the fact that flat-die, extruded, film of uniform thickness less than 0.5 mil can be obtained from the heat treated polyethylene. This can not be done with the standard process, low pressure, polyethylenes. In fact, film uniformity is poor with the standard process polyethylenes even at thicknesses of 2 to 3 mols. Furthermore, the superior impact strength, clarity, and gloss of the heat treated polyethylene film are especially important advantages for commercial use.

Example 7

A series of high density polyethylenes varying in density from 0.938 to 0.963 and covering the melt index range of 0.001 to 9.0 were heat treated by use of the same apparatus and procedures described in Example 1. The following list gives the pertinent data on the original polyethylene, the heat treating conditions, and the heat treated product.

applying vacuum to the mill vapor port. Product was obtained at the rate of 25 pounds/hr.

| Run | Original Polyethylene | | Heat Treatment | | Product | | |
|---|---|---|---|---|---|---|---|
| | Melt Index | Density | Temp., °C. | Time, sec. | Melt Index | Density | Brittle Temp., °C. |
| A | 0.001 | 0.938 | 448 | 12 | 14.8 | 0.959 | −100 |
| B | 3.1 | 0.957 | 334 | 97 | 28.0 | 0.960 | −55 |
| C | 9.0 | 0.963 | 305 | 332 | 49.0 | 0.967 | −30 |

The products of runs A and B injection molded (375° C.) to give glossy, stiff, and tough articles. The product of run C was applied as melted liquids (190° C.) to paper to give flexible, tough coatings. This last type of product may also be blended with paraffin waxes for coating paper in concentrations from 2% to 40%. The resultant coatings are much tougher than the paraffin wax and display superior gloss.

Example 8

A low pressure process, polyethylene having a melt index of 0.4 and a density of 0.950 was heat treated in a continuous, enclosed, mill to give product at the rate of 21 pounds per hour. The mill was fed by a single screw plastic extruder, at a metered rate of 21 pounds per hour. In the extruder the polyethylene was preheated to 220° C. The mill was heated to 367° C. by Dowtherm vapor in the mill heating jacket. Once in the mill, the polyethylene was concurrently heat treated and drawn into the bite of two helically threaded rolls, which were rotating in opposite directions. The rolls had a pitch diameter of 5 inches and a working length of 15 inches. These threaded rolls uniformly worked the hot polyethylene and conveyed it through a mill to a discharge pipe. The temperature of the polyethylene in the mill was 338° C. Residence time of the polyethylene at this temperature was 357 seconds. No vacuum was applied to the mill port provided for such purposes. This port was left open to the air. The heat treatment was, therefore, started in the presence of a small amount of air. The product had a melt index of 3.5 and a density of 0.95.

This heat treated polyethylene gave molded articles of satisfactory gloss and no "skinning" at injection molding temperatures of 500–525° C. and a 11–12 second molding cycle (6000 p.s.i. pressure). The following is a characterization of this product.

| | |
|---|---|
| Melt Index | 3.5 |
| Density | 0.952 |
| Secant Modulus, p.s.i.[1] | 110,000 |
| Tensile Strength, p.s.i.[1] | 3,170 |
| Hardness, Durometer D [1] | 60 |
| Brittle Temperature, °C.[1] | −90 |

| | Flat-Die Extruded Film | Tubular Extruded Film |
|---|---|---|
| Compound Temp., °C. | 208 | 175 |
| Test Thickness, mils | 1.5 | 1.5 |
| Tensile Strength, p.s.i. (M.D./T.D.) | 2,760/2,870 | 3,980/3,930 |
| Falling Ball Impact, inches | 15 | 15 |
| Elongation, percent (M.D./T.D.) | 610/350 | 675/465 |
| See-Through, feet | 42 | 61 |
| "Neck-In," inches [2] | 3 | |
| Drawdown, mils/FPM [2] | 0.2/165 | 0.15/170 |
| Haze, percent | 9 | 19 |

[1] Compression molded plaques.
[2] At extrusion compound temperature of 275° C. (FPM=extrusion rate in feet per minute).

Example 9

A low pressure process, polyethylene having a melt index of 0.2 and a density of 0.949 was heat treated in the same apparatus described in Example 1, except that the pressure in the mill was maintained at 30 mm. by In this case, the mill jacket temperature was 393° C., the temperature of the polyethylene in the mill was 347° C., and the residence time was 272 seconds.

The product had a melt index of 19 and a density of 0.954 and was especially suited for high-speed injection molding. The following list compares some of the properties of this product with those of a standard, low pressure process, polyethylene of comparable melt index.

| | Original Polyethylene | Heat Treated Polyethylene | Standard Process Polyethylene |
|---|---|---|---|
| Melt Index | 0.2 | 19 | 19 |
| Density [1] | 0.949 | 0.954 | 0.952 |
| Hardness, Durometer D [1] | 60 | 62 | 61 |
| Tensile Strength, p.s.i.[1] | 3,450 | 2,840 | 2,550 |
| Stiffness, Torsion, p.s.i.[1] | 75,000 | 120,000 | 90,000 |
| Elongation, percent [1] | 130 | 30 | 30 |
| Brittle Temperature, °C.[1] | −105 | −30 | −15 |
| Minimum Gloss Temp., °F.[2] | 600 | 325 | 400 |
| Minimum Non-Skinning Temp. °F.[2] | 600 | 350 | 425 |

[1] Compression molded plaques.
[2] Injection molding.

Example 10

A low pressure process polyethylene having a melt index of 0.2 and a density of 0.951 was heat treated in the apparatus and with the procedure described in Example 8.

In this case, the mill jacket temperature was 364° C., the temperature of the polyethylene in the mill was 345° C., and the residence time at this temperature was 208 seconds.

The product had a melt index of 6.8 and a density of 0.954. This product was found to be superior to a standard, low pressure process, polyethylene of comparable melt index for injection molding as is shown in the following list.

| | Original Polyethylene | Heat Treated ethylene | Standard Process Polyethylene |
|---|---|---|---|
| Melt Index | 0.2 | 6.8 | 6.4 |
| Density [2] | 0.951 | 0.954 | 0.952 |
| Tensile Strength, p.s.i.[2] | 3,170 | 3,170 | 2,900 |
| Percent Elongation [2] | 100 | 40 | 40 |
| Secant Modulus, p.s.i.[2] | 80,000 | 115,000 | 90,000 |
| Brittle Temperature, °C.[2] | −100 | −70 | −60 |
| Minimum Gloss Temp., °F [1] | 600 | 425 | 375 |
| Minimum Non-Skinning Temp., °F.[1] | 600 | 425 | 525 |

For footnotes see preceding table.

Example 11

A series of polyethylenes varying in density from 0.945 to 0.960 and in melt index from 0.04 to 8 were heat treated in the apparatus described in Example 8. The pertinent data on the original polyethylene, the heat treating conditions, and the product are given as follows:

| Run | Mill Pressure | Original Polyethylene | | Heat Treatment | | Product | |
|---|---|---|---|---|---|---|---|
| | | Melt Index | Density | Temp., °C. | Time, sec. | Melt Index | Density |
| A | Atmos | 0.04 | 0.945 | 338 | 225 | 0.3 | 0.950 |
| B | Atmos | 0.2 | 0.950 | 324 | 292 | 3.9 | 0.951 |
| C | 46 mm | 1.5 | 0.952 | 333 | 155 | 8.4 | 0.954 |
| D | 46 mm | 8.0 | 0.956 | 304 | 427 | 47.0 | 0.959 |

The product of run A was satisfactorily extruded onto wire as an insulating coating. The product of run B was a highly satisfactory polyethylene for extruding thin films, rod and pipe. Run C gave a polyethylene which could be melt applied, in admixture with paraffin waxes, to paper and metal foil to give tough, glossy coatings.

The following table indicates certain of the procedures employed in determining the properties of the molded resins of the examples contained herein:

| | ASTM Procedure |
|---|---|
| Tensile strength | D-412-51 |
| Elongation | D-412-51 |
| Secant modulus | D-747-50 |
| Brittle temperature | D-746-55T |

It should be noted that the thermal treating procedure described herein will proceed at widely varying pressures, and is not therefore critical. Illustratively pressures in the range of 10,000 p.s.i. to 2 mm. Hg are thoroughly operative.

The see-through values given herein are determined by a method which is designed to determine polyethylene film clarity.

(1) Apparatus and samples:

(a) A standard AMA[1] eye chart having a 20/30 vision line.

(b) Film sample 8 x 10 inches and 1.5±0.1 mils in thickness.

(2) Method:

(a) Test conditions. Place the standard AMA chart having a 20/30 vision line in a vertical position so that its center is about 5 feet off the floor and capable of being viewed from a horizontal distance of 26 feet.

(b) Mark off the viewing distance in feet either on the floor or by some other practical arrangement.

(c) Unless otherwise specified, mount a 200-watt silver-tipped bulb and reflector directly in line with the viewer and about 3 feet above and 3 feet in front of the chart.

(d) Illuminate the chart by turning on the light bulb switch. Take necessary precautions to prevent interference from outside lighting.

(e) Procedure. Hold a test specimen of the sample film Section 3, about one foot in front of the eyes, and determine the maximum distance in feet (chart to film) at which the 20/30 line on the eye chart can be distinguished as well as the degree of clarity of the print. For example, if the see-through distance is 26 feet, rate the sample according to the following code:

26 (a) Lettering very sharp and clear
26 (b) Easily distinguishable
26 (c) Somewhat blurred (f) Whenever possible, determine the see-through distances on at least three test specimens for a given sample film and record the average value.

We claim:

1. Process for improving the extrudability of solid high density polyethylene which comprises continuously moving a mass of normally solid polyethylene having an initial density of at least 0.94 through a pyrolysis zone maintained at a temperature of from about 325° C. to about 475° C., the residence time of said polyethylene within said pyrolysis zone being within the range of 10 to 600 seconds, and recovering a normally solid polyethylene having a melt index in the range of from 0.1 to 50 and a lower molecular weight.

2. Process for improving the extrudability of solid thermoplastic high density polyethylene which comprises continuously moving a mass of normally solid polyethylene having an initial density of from 0.94 to 0.98 at 25° C., and an initial melt index of from 0 to 10 through a pyrolysis zone maintained at a temperature of from about 325° C. to about 475° C., the passage of said polyethylene through said pyrolysis zone being so conducted that substantially all of said polyethylene receives substantially the same thermal treatment and the residence time of said polyethylene within said pyrolysis zone being within the range of about 10 to about 600 seconds and commensurate with the initial melt index of said polyethylene and the temperature of said pyrolysis zone to cause the thermally treated thermoplastic polyethylene issuing from said pyrolysis zone to have an increased melt index within the range of from about 0.1 to about 50, and a density within the same range as prior to entering said pyrolysis zone.

3. The process according to claim 2 in which the pyrolysis zone is maintained in a vacuum.

4. The process according to claim 2 in which the thermal treatment of polyethylene within the pyrolysis zone is conducted in the substantial absence of oxygen.

5. The process according to claim 2 in which the pyrolysis zone is maintained at a temperature of from about 325° C. to about 450° C.

6. The process according to claim 2 in which from 5 to 90 percent by weight of a solvent is present during the pyrolysis.

7. The process according to claim 2 wherein the pyrolyzed polyethylene after removal from the pyrolysis is cooled to a temperature less than 300° C. before being discharged to the atmosphere.

8. The process according to claim 7 wherein the cooled pyrolyzed polyethylene is mechanically milled under vacuum at a temperature no greater than 275° C.

9. A heat-modified solid thermoplastic polyethylene characterized by having a density of from 0.94 to 0.98 grams per cubic centimeter at 25° C., a melt index in the range of from 0.1 to 50 prepared according to the process of claim 2.

10. A substantially uniform polyethylene film of the product of claim 9, additionally characterized by having a haze of no more than 20 percent, a gloss value of at least 50 and a See-Through value of at least 20 feet, all measured on a film of a thickness of 1.5 mils ± 0.1 mil.

11. A self-supporting film as defined in claim 10.

12. A film as defined in claim 10 supported on a dissimilar substrate.

13. A supported film as defined in claim 12 wherein the substrate is paper.

14. A supported film as defined in claim 12 wherein the substrate is metal foil.

15. In a process for the pyrolysis of a high molecular weight, normally solid polymer of an olefin to produce a lower molecular weight normally solid pyrolyzed polymer, the improvement which comprises passing said polymer through a pyrolysis zone in the form of a fluid stream having annular cross section, and transferring heat of pyrolysis to said polymer through both the exterior and the interior boundaries of the annular stream.

16. The process as defined in claim 15 wherein the pyrolysis zone is maintained at a temperature between about 325° C. to about 475° C.

17. The process as defined in claim 16 wherein the pyrolysis zone is maintained in a vacuum and in the substantial absence of oxygen.

References Cited

UNITED STATES PATENTS

| 2,367,173 | 1/1945 | Martin. |
| 2,480,615 | 8/1949 | Strain et al. |
| 2,692,258 | 10/1954 | Roebuck et al. |
| 2,827,446 | 3/1958 | Breslow. |
| 2,857,369 | 10/1958 | Johnson. |
| 2,862,917 | 12/1958 | Anderson et al. |
| 2,910,460 | 10/1959 | Aries. |
| 2,912,410 | 11/1959 | Cole. |

FOREIGN PATENTS

| 569,043 | 5/1945 | Great Britain. |

(Other references on following page)

---

[1] American Medical Association.

OTHER REFERENCES

Chemical Week, vol. 77, No. 2, pp. 48 and 50, July 9, 1955.

Madorsky et al., J. Res. N.B.S., vol. 53, December 1954, pp. 361–370.

Modern Plastics, vol. 33, No. 1, pp. 85–92, 210, 212, 214 (pp. 90–91 relied upon), September 1955.

JOSEPH L. SCHOFER, *Primary Examiner.*

L. EDELMAN, *Assistant Examiner.*